(12) United States Patent
Zhang et al.

(10) Patent No.: US 8,873,441 B2
(45) Date of Patent: Oct. 28, 2014

(54) METHOD FOR LTE DOWNLINK SCHEDULING WITH MIMO

(75) Inventors: Honghai Zhang, Ewing, NJ (US);
Narayan Prasad, Wyncote, PA (US);
Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/343,192

(22) Filed: Jan. 4, 2012

(65) Prior Publication Data

US 2012/0170530 A1 Jul. 5, 2012

Related U.S. Application Data

(60) Provisional application No. 61/450,255, filed on Mar. 8, 2011, provisional application No. 61/429,576, filed on Jan. 4, 2011.

(51) Int. Cl.
| | |
|---|---|
| *H04B 7/00* | (2006.01) |
| *H04W 4/00* | (2009.01) |
| *H04W 72/04* | (2009.01) |
| *H04L 1/00* | (2006.01) |
| *H04L 5/00* | (2006.01) |
| *H04L 1/06* | (2006.01) |
| *H04W 72/12* | (2009.01) |
| *H04B 7/04* | (2006.01) |
| *H04B 7/06* | (2006.01) |

(52) U.S. Cl.
CPC ........ *H04W 72/0406* (2013.01); *H04W 72/042* (2013.01); *H04L 1/06* (2013.01); *H04W 72/1231* (2013.01); *H04L 1/0003* (2013.01); *H04L 1/0009* (2013.01); *H04L 5/0046* (2013.01); *H04L 1/0026* (2013.01); *H04B 7/0417* (2013.01); *H04W 72/04* (2013.01); *H04B 7/0465* (2013.01); *H04L 5/0037* (2013.01); *H04B 7/0452* (2013.01); *H04L 5/0023* (2013.01); *H04B 7/0626* (2013.01)
USPC ............ 370/310; 370/328; 370/329; 455/68; 455/69; 455/91

(58) Field of Classification Search
CPC ............ H04W 72/0406; H04W 72/04; H04W 72/042; H04W 72/1231; H04L 1/0026; H04L 1/0003; H04L 1/0009; H04L 5/0037; H04L 5/0046; H04L 5/0023; H04L 1/06; H04B 7/0452; H04B 7/0465; H04B 7/0626; H04B 7/0417
USPC ......... 370/234, 235, 238, 252, 253, 260, 310, 370/316, 328, 329, 332, 334; 455/24, 68, 455/69, 70, 91, 101, 103, 561, 562.1
See application file for complete search history.

(56) References Cited

U.S. PATENT DOCUMENTS 7,813,282 B2 * 10/2010 Kim et al. .................. 370/234
7,894,382 B2 * 2/2011 Choi et al. .................. 370/328

(Continued)

OTHER PUBLICATIONS

NEC1, "NEC Laboratories America, Inc: Invention Record", Apr. 7, 2010, NEC Laboratories, pp. 1-9.*

(Continued)

*Primary Examiner* — Kwang B Yao
*Assistant Examiner* — Adam Duda
(74) *Attorney, Agent, or Firm* — Joseph Kolodka

(57) ABSTRACT

A method for LTE or WiMAX scheduling includes collecting, by a basestation BS, channel feedback from multiple mobiles with downlink traffic. The channel feedback enables the BS to determine an achievable rate or block error probability if transmitting to a mobile with a given modulation and coding scheme MCS and multiple-input multiple-output MIMO mode. The method includes determining, by the BS, which of the mobiles is scheduled on each resource block RB and what the MCS and MIMO mode is selected for each scheduled mobile, and allocating bits on the set of the RBs assigned to each scheduled mobile.

15 Claims, 5 Drawing Sheets

(56) References Cited

U.S. PATENT DOCUMENTS 7,933,238 B2 * 4/2011 Sartori et al. .............. 370/328
2008/0219219 A1 * 9/2008 Sartori et al. .............. 370/335

OTHER PUBLICATIONS

NEC2, "NEC Laboratories America, Inc: Invention Record", Apr. 7, 2010, NEC Laboratories, p. 1-6.*

M. Andrews, L. Zhang, "Scheduling algorithms for multi-carrier wrieless data systems", Mobicom 2007 (Sep. 14, 2007), ACM Mobicom 2007, all pages.*

S. Lee, S. Chaudhury, A Khoshnevis, S. Xu, S. Lu, "Downlink MIMO with frequency-domain packet scheduling for 3GPP", Apr. 25, 2009, IEEE Infocom 2009, all pages.*

R. Kwan, C. Leung, J. Zhang "Multiuser scheduling on the downlink of an LTE cellular system", May 27, 2008, Research Letters in Communications (vol. 2008), all pages.*

Honghai Zhang, Narayan Prasad, Smapath Ramgarajan, "MIMO Downlink Scheduling in LTE and LTE-Adacvanced Systems", Mar. 30, 2012, IEEE Infocom 2012 mini-conference, all pages.*

Honghai2, "Publications", Mar. 1, 2012 Archive.org snapshot of Honghai's NEC-Labs.com personal page, NEC Labs, all pages.*

"Short version"—Honghai Zhang, Narayan Prasad, Smapath Ramgarajan, "MIMO Downlink Scheduling in LTE and LTE-Adacvanced Systems", Mar. 30, 2012, IEEE Infocom 2012 mini-conference, all pages.*

"Long version1" (In browser)—Honghai Zhang, Narayan Prasad, Smapath Ramgarajan, "MIMO Downlink Scheduling in LTE and LTE-Adacvanced Systems", Jun. 2011, NEC Labs America, pp. 1-5 [document is 5+ pages, therefore incomplete]. (http://www.nec-labs.com/~honghai/TR/lte-scheduling.pdf).*

"Long version2" (cropped, Non-Browser)—Honghai Zhang, Narayan Prasad, Smapath Ramgarajan, "MIMO Downlink Scheduling in LTE and LTE-Adacvanced Systems", Jun. 2011, NEC Labs America, pp. 1-5 [document is 5+ pages, therefore incomplete]. (http://www.nec-labs.com/~honghai/TR/lte-scheduling.pdf).*

* cited by examiner

US 8,873,441 B2

METHOD FOR LTE DOWNLINK SCHEDULING WITH MIMO

This application claims the benefit of both U.S. Provisional Application No. 61/450,255, entitled, "MIMO Downlink Scheduling in LTE and LTE-Advanced Systems", filed Mar. 8, 2011, and U.S. Provisional Application No. 61/429,576, entitled, "LTE Downlink Scheduling with MIMO Under Practical Constraints", filed Jan. 4, 2011, of which the contents of all are incorporated herein by reference.

BACKGROUND OF THE INVENTION

The present invention relates generally to wireless networks and more particularly to LTE downlink scheduling.

Long-term evolution LTE downlink scheduling with multiple-input multiple-output MIMO encompasses several practical constraints such as equal power allocation, common MIMO mode, maximum number of scheduled users. Most researchers who studied downlink DL scheduling only considered single-input single-output SISO scheduling and most of them did not consider the foregoing mentioned practical constraints.

Of particular interest is the common MIMO mode, which requires that a common MIMO mode (such as the precoding matrix, rank) should be employed across all resource blocks RBs allocated to a given user. Moreover, if the rank of the precoding matrix is at least two, two codewords are used and each codeword is assigned with one modulation-and-coding scheme MCS.

A few recent works considered some of the constraints this invention considers, but not all of them. One prior art work considered the scheduling problem with finite queue but only SISO was considered. Another prior work studied the MIMO scheduling but did not consider other constraints (such as finite queue, user limit, etc). And their algorithms only support two possible MIMO modes (transmit diversity and spatial Multiplexing) while we consider the number of streams as the MIMO modes, which can be more than 2. Another prior effort considered the common MCS constraint but only for SISO and only a greedy solution without performance guarantee was proposed.

Accordingly, there is a need for a method for LTE downlink scheduling with MIMO that overcomes the limitations of prior efforts.

BRIEF SUMMARY OF THE INVENTION

The invention is directed to a method for full LTE or WiMAX scheduling that includes collecting, by a basestation BS, channel feedback from multiple mobiles with downlink traffic. The channel feedback enables the BS to determine an achievable rate or block error probability if transmitting to a mobile with a given modulation and coding scheme MCS and multiple-input multiple-output MIMO mode. The BS determines which of the mobiles is scheduled on each resource block RB and what the MCS and MIMO mode is selected for each scheduled mobile, and allocates bits on the set of the RBs assigned to each scheduled mobile.

These and other advantages of the invention will be apparent to those of ordinary skill in the art by reference to the following detailed description and the accompanying drawings.

DETAILED DESCRIPTION

The present invention is directed to the LTE downlink scheduling with MIMO and several other practical constraints such as equal power allocation, common MIMO mode, and maximum number of scheduled users. The inventive method considers the common MIMO mode that requires that a common MIMO mode (such as the precoding matrix, rank) should be employed across all RBs allocated to a given user. Moreover, if the rank of the precoding matrix is at least two, two codewords are used and each codeword is assigned with one MCS. The inventive method also accounts for both a backlogged traffic model and a finite queue model. The inventive method encompasses a non-trivial greedy process which achieves ½-approximation guarantee in the worst case for formulated problems for a backlogged traffic model and for a finite queue model as mixed linear programming problems.

Figure 1:
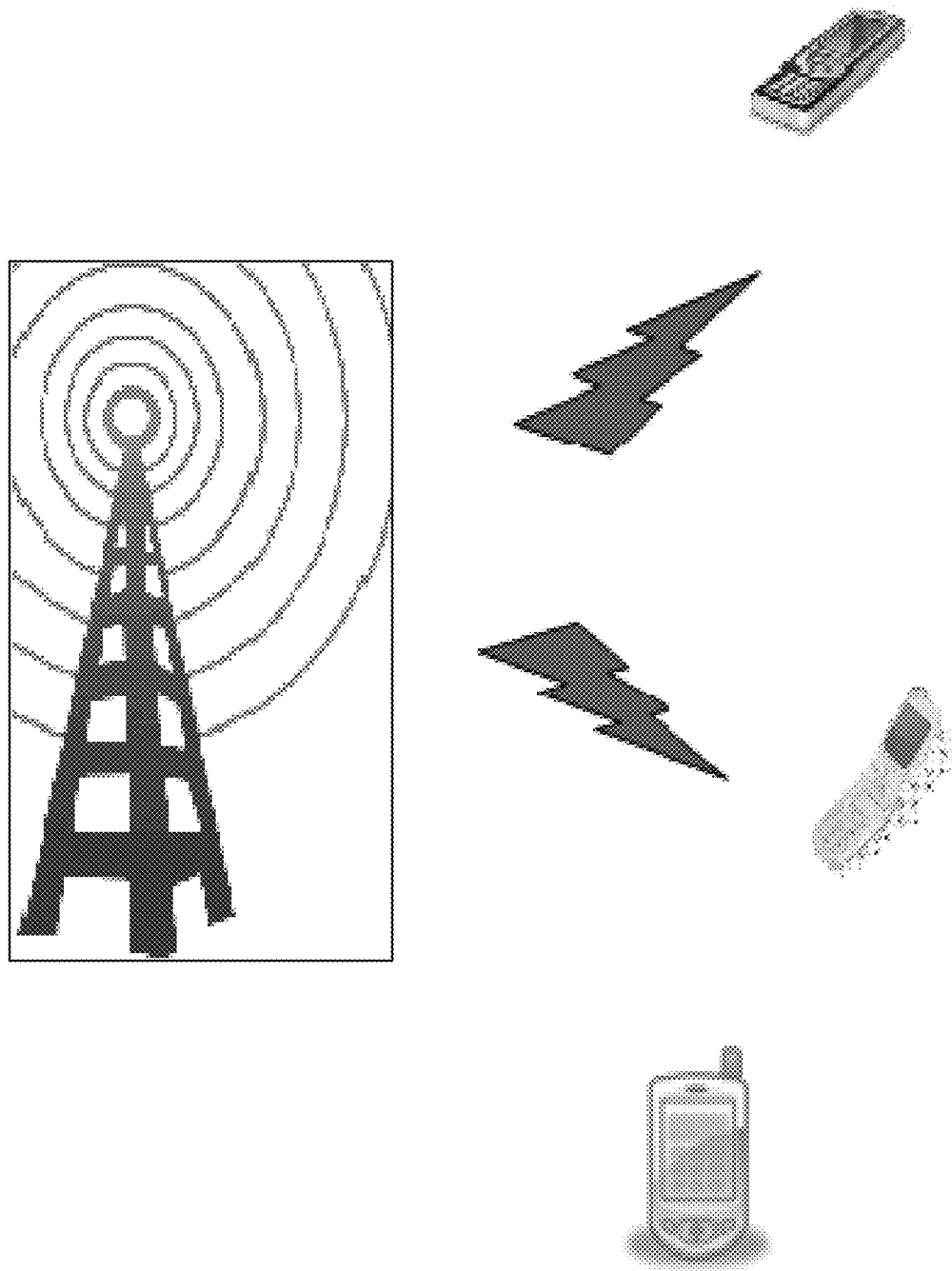
FIG. 1 depicts a an exemplary LTE or WiMAX system showing a base station and mobile devices in which the present invention is implemented.

Implementation of the inventive method if implemented is in an LTE or WiMAX base station, shown in an exemplary configuration in FIG. 1. The base station communicates with exemplary mobile units shown.

In the inventive procedure for LTE scheduling in a base station, the BS performs collecting and determining functions 200. 1) The BS collects the channel feedback from each mobile unit with downlink traffic. With such information, the BS can determine the achievable rate or the block error probability if transmitting to a mobile with a given modulation and coding scheme MCS and MIMO mode. 2) The BS determines which mobile is scheduled on each RB and what MCS and MIMO mode is selected for each scheduled mobile, and allocates bits on the set of RBs assigned to each scheduled mobile.

The inventive process for determining user scheduling and bit allocation is a unified scheme 200.2. Referring now to the flow diagram of FIG. 2A plus 2B, the unified scheme begins with the current value $V(n)=0$ for all RBs "n" up to N 205. $V(n)$ is the weighted data rate of the current allocation on RB n. A MIMO mode is defined as the combination of operational mode (transmission diversity or spatial multiplexing), the precoding matrix employed, and the MIMO rank. The transmission mode m is defined as a combination of a MIMO mode and up to two MCSs of the associated codewords.

The termination condition 210 occurs when any the following is satisfied: a: No candidate users are available for scheduling; b: The number of scheduled users reaches the maximum limit; or c: $g(u^*,m^*)<=0$.

The present method determines 220 the weighted rate $v(u, n, m)$ and $gain(u,m)$ when the MIMO rank is one (and there is one codeword and one MCS): $v(u,n,m)$ represents the weighted data rate for user u on resource block RB n with transmission mode m with queue size limit. $g(u,m)$ represents the total gain of user u with transmission mode m on all RBs. The determination depends on the traffic model: A. Backlogged traffic model and B. Finite queue model.

For the Backlogged traffic model, v(u,n,m) is the weighted data rate $v(u,n,m)=w_u r_{u,n}^m$ 221 and g(u,m) is the total gain on all RBs when scheduling user u with transmission mode m 222

$$g(u, m) = \sum_{n=1}^{N} \max(0, v(u, n, m) - V(n)).$$

For the Finite queue model, $Q_u$ is the total queue size for user u. Let R be the set of RBs with positive gain (v(u,n,m)>V(n)) if fully allocated. Let $k_1 = \lfloor Q_u/T_m \rfloor$, $T_m$ is the transport block size with MCS m.

Figure 2A:
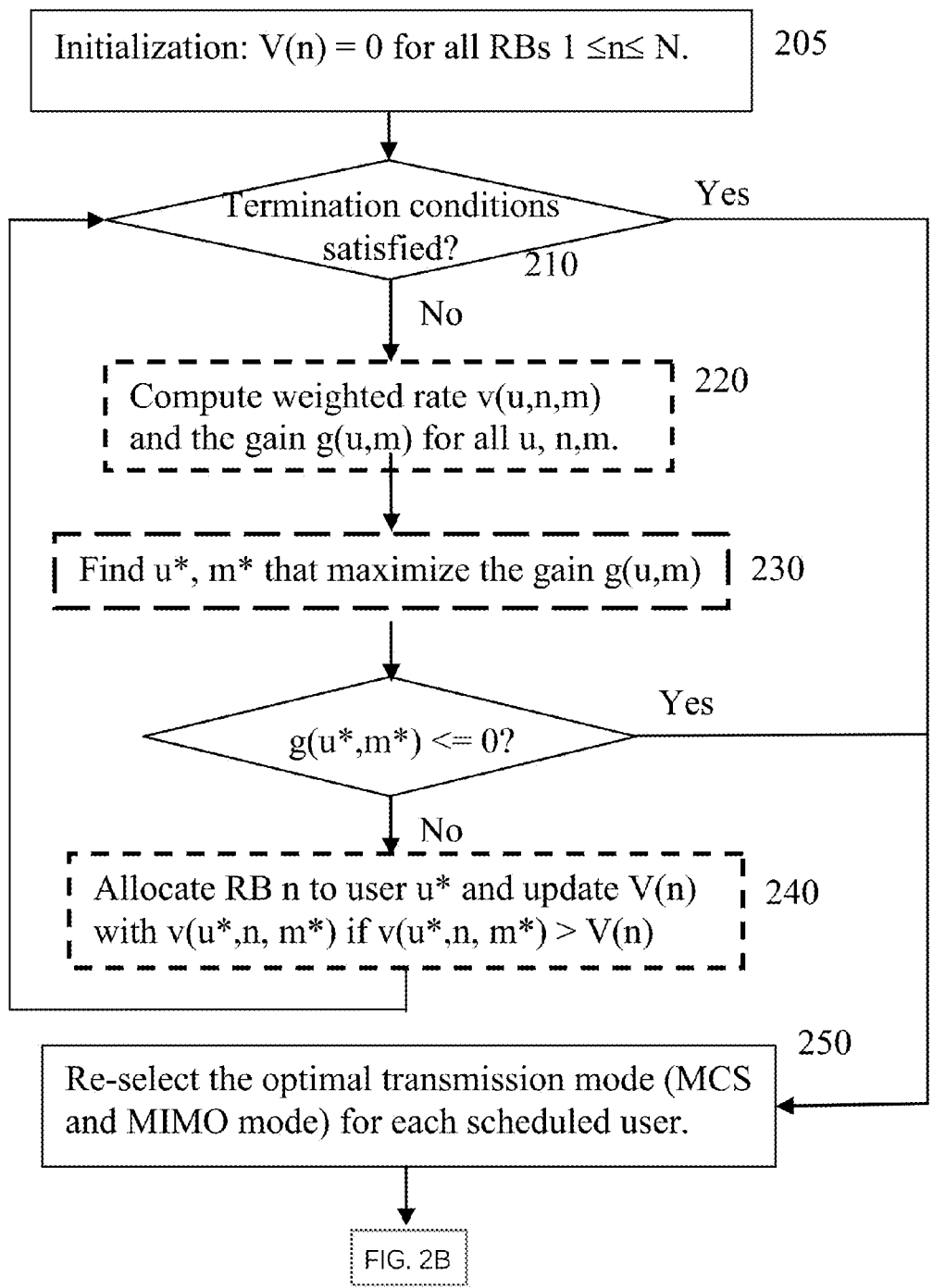
FIG. 2A/2B is a flow diagram of LTE downlink scheduling with MIMO in accordance with the invention.
Figure 2B:
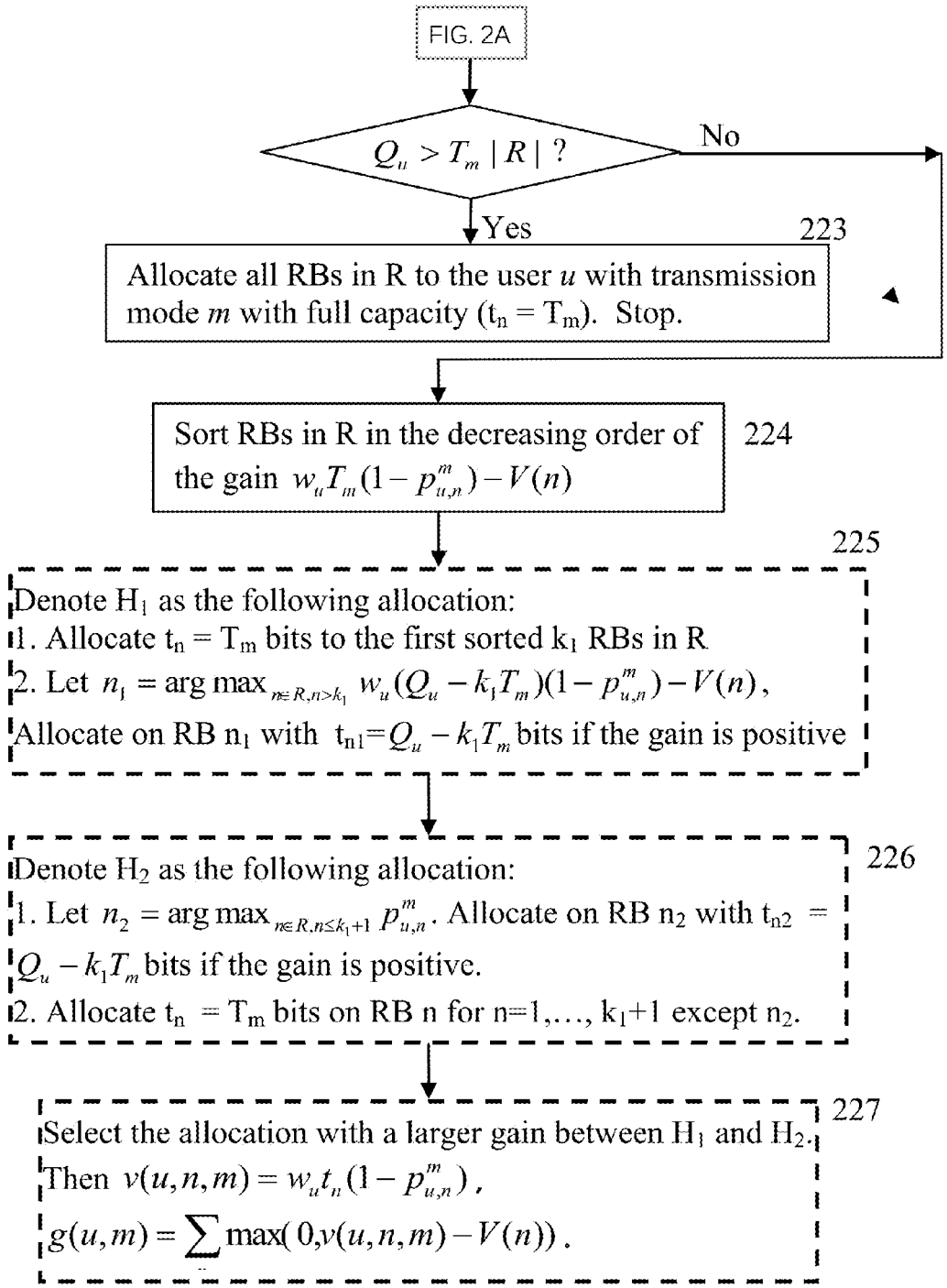
Figure 3A:
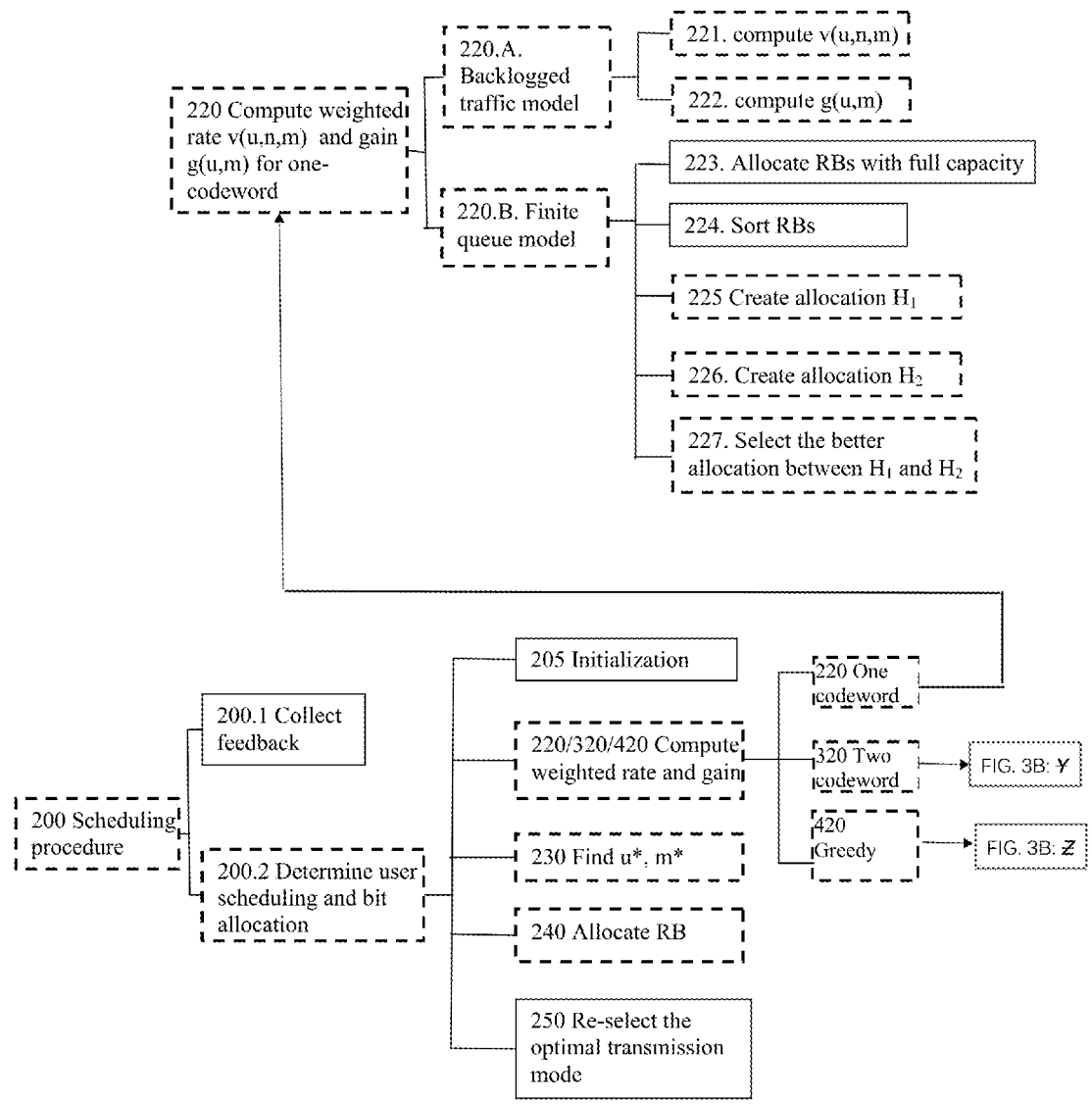
FIG. 3A/3B is an expanded diagram of the flow diagram of FIG. 2A/2B.
Figure 3B:
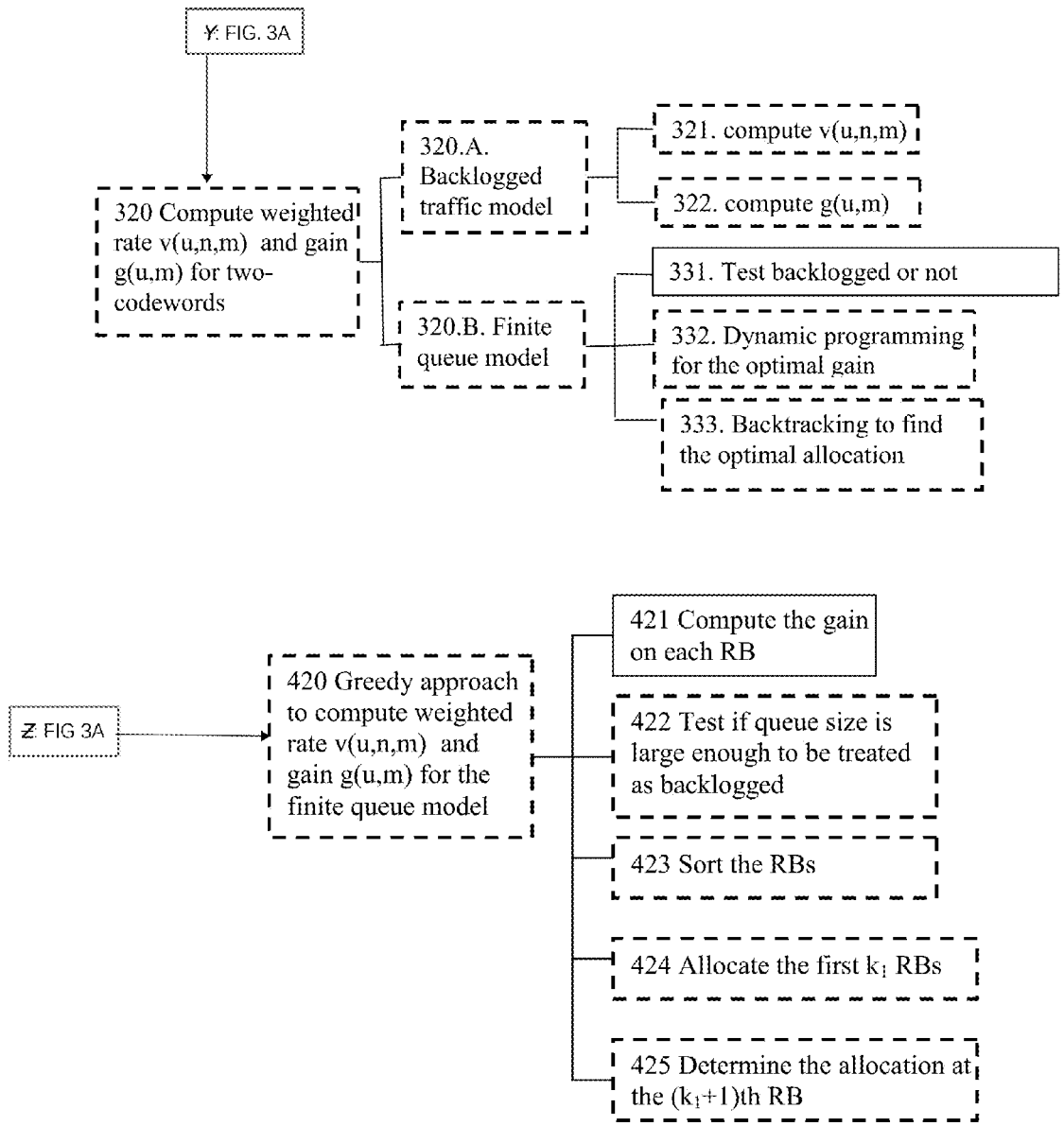

Referring again to the flow chart of FIG. 2A/2B, if $Q_u > T_m|R|$ then the method allocates all RBs in R to the user u with transmission mode m with full capacity ($t_n = T_m$) and the method stops 223.

If $Q_u$ is not>$T_m|R|$, the method sorts RBs in R in the decreasing order of the gain $w_u T_m(1-p_{u,n}^m)-V(n)$ 224. $H_1$ is denoted as the following allocation: 1. Allocate $t_n=T_m$ bits to the first sorted $k_1$ RBs in R. 2. Let $n_1 = \arg\max_{n \in R, n > k_1} w_u(Q_u - k_1 T_m)(1-p_{u,n}^m)-V(n)$, and allocate on RB $n_1$ with $t_{n1}=Q_u-k_1 T_m$ bits if the gain is positive 225.

$H_2$ is denoted as the following allocation: 1. Let $n_2 = \arg\max_{n \in R, n \le k_1+1} p_{u,n}^m$. The inventive method allocates on RB $n_2$ with $t_{n2}=Q_u-k_1 T_m$ bits if the gain is positive. 2. Allocate $t_n=T_m$ bits on RB n for n=1, ..., $k_1+1$ except $n_2$ 226.

Then the inventive method selects the allocation with a larger gain between $H_1$ and $H_2$. Then $v(u,n,m)=w_u t_n (1-p_{u,n}^m)$, $$g(u, m) = \sum_{n} \max(0, v(u, n, m) - V(n)) 227.$$

In step 230, the method finds u*, m* that maximize gain g(u,m). If g(u*,m*) is less than or equal to 0 then the method reselects the optimal transmission mode (MCS and MIMO mode) for each scheduled user 250. Otherwise, the invention allocates RB n to user u* and updates V(n) with v(u*, n, m*) if v(u*, n, m*) is greater than V(n) 240 and loops back to determine if termination conditions are satisfied 210.

Referring to the flow diagram of FIGS. 2A/2B and 3A/3B, the present method determines 320 the weighted rate v(u,n,m) and gain g(u,m) when the MIMO rank is at least two (and there are two codewords and two MCSs): v(u,n,m) represents the weighted data rate for user u on RB n with transmission mode m with queue size limit. The parameter g(u,m) represents the total gain of user u with transmission mode m on all RBs. The determination depends on the traffic model. Notice that each transmission mode m contains two MCSs $\phi 1$ and $\phi 2$.

For the A. Backlogged traffic model: At step 321: v(u,n,m) is the weighted data rate $v(u, n, m)=w_u r_{u,n}^m$ where $r_{u,n}^m=T_{\phi 1}(1-p_{u,n}^{\Phi 2})+T_{\phi 2}(1-p_{u,n}^{\Phi 2})$. At step 322: parameter g(u,m) is the total gain on all RBs when scheduling user u with transmission mode m.

$$g(u, m) = \sum_{n=1}^{N} \max(0, v(u, n, m) - V(n))$$

For the B. Finite queue model: $Q_u$ is the total queue size for user u. Let R be the set of RBs with positive gain (v(u,n,m)>V(n)) if fully allocated. Let $k_1=\lfloor Q_u/T_m \rfloor$, $T_m=T_{\phi 1}+T_{\phi 2}$ is the transport block size with transmission m (including two codewords with MCS $\phi 1$ and $\phi 2$).

At 331, step 1: If $Q_u \ge (T_{\phi 1}+T_{\phi 2})|R|$, then the invention considers this as the backlogged case, and allocates all RBs in R to user u. the method stops. At 332, step 2: The inventive method defines $g_n(t)$ as the maximum gain with total t bits for RBs 1 to n. $s_n(t)$ is the optimal number of bits allocated to RB n in order to maximize $g_n(t)$. The inventive method applies dynamic programming to determine $g_n(t)$ and $s_n(t)$ for all n, t. This involves developing the recursive equations for $g_n(t)$ and $s_n(t)$, and applying these equations iteratively in the increasing order of n and t such that the results of early calculations can be reused without re-calculation. It is also possible to define $h_n(g)$ as the minimum number of bits required to achieve a gain g with RBs 1 to n, and then to develop recursive equations and dynamic programming based on these equations. The procedure is similar. Dynamic programming can also be applied to develop fully polynomial-time approximation scheme FPTAS. The basic idea is to perform quantization on the number t of bits or the gain g (i.e., viewing K bits as one unit of data or G gain as one unit of gain), and then to apply dynamic programming on the quantized data bits or gain to obtain approximation algorithms. At 333, step 3: The inventive method applies backtracking using the results $s_n(t)$ to find the optimal allocation of bits to RBs to achieve the maximum gain. This also includes drifting data from a codeword with a higher block error rate BLER to another with a lower BLER until only one codeword becomes partially allocated.

At 420: The inventive method determines the weighted rate v(u,n,m) and gain g(u,m) for the case of finite queue (one codeword in 220B and two codewords in 320B) using the following simplified (unified) greedy approach to reduce the complexity, although it is not optimal. At 421: Step 1. Assuming a backlogged traffic model, the inventive method determines the gain on each RB n. The gain g(u,n,m)=v(u,n,m)−V(n). At 422: Step 2. Only consider the set R of RBs with positive gain g(u,n,m) hereafter. If $Qu \ge (T_{\phi 1}+T_{\phi 2})|R|$, the inventive method assumes a backlogged traffic model and allocates all RBs in R to user u (note that all the allocations we discuss when computing v(u,n,m) and g(u,m) is only tentatively and the RBs may be re-allocated later). At 423: Step 3. The inventive method sorts g(u,n,m) in the decreasing order for all RBs n in R (Note that u and m are fixed here). Let $k_1=\lfloor Q_u/T_m \rfloor$. At 424: the inventive method allocate a $k_1$ RBs in R with the highest gain g(u,n,m) to user u. At 425: For the ($k_1+1$)th RB, if allocating the remaining bits ($Qu-k_1*T_m$) to user u can achieve a positive gain, then the invention allocates it to user u. Otherwise, stop.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:
1. A method for LTE or WiMAX scheduling comprising the steps of:
collecting, by a basestation BS, channel feedback from multiple mobiles with downlink traffic, the channel feedback enabling the BS for determining an achievable rate or block error probability if transmitting to a mobile with a given modulation and coding scheme MCS and multiple-input multiple-output MIMO mode; and determining, by the BS, which of the mobiles is scheduled on each resource block RB and what the MCS and MIMO mode is selected for each scheduled the mobile, and allocating bits on the set of the RBs assigned to each scheduled mobile, wherein the determining comprises determining a weighted rate v(u,n,m) and gain g(u,m) and when a MIMO rank is one and there is one codeword and one MCS, for a backlogged traffic model, the weighted data rate is based in part on $v(u,n,m)=w_u r_{u,n}^m$ and gain is based in part on $$g(u, m) = \sum_{n=1}^{N} \max(0, v(u, n, m) - V(n)),$$

v(u,n,m) representing the weighted data rate for user u on resource block RB n with transmission mode m with queue size limit, and g(u,m) representing the total gain of user u with transmission mode m on all resource blocks RBs when scheduling user u with transmission mode m.

2. The method of claim 1, wherein the determining a rate and gain comprises, when a MIMO rank is one and there is one codeword and one MCS, for a finite queue traffic model, $Q_u$ being a total queue size for user u, and R being a set of resource blocks RBs with positive gain (v(u,n,m)>V(n)) if fully allocated, letting $k_1 = \lfloor Q_u/T_m \rfloor$, where $T_m$ is a transport block size with MCS m and sorting RBs in R in a decreasing order of the gain $w_u T_m(1-p_{u,n}^m) - V(n)$.

3. The method of claim 2, wherein the determining a rate and gain comprises denoting a parameter $H_1$ as the following allocation: allocate $t_n = T_m$ bits to the first sorted $k_1$ RBs in R. 2. Let $n_1 = \arg\max_{n \in R, n > k_1} w_u(Q_u - k_1 T_m)(1-p_{u,n}^m) - V(n)$, and allocate on RB $n_1$ with $t_{n1} = Q_u - k_1 T_m$ bits if the gain is positive.

4. The method of claim 3, wherein the determining a rate and gain comprises denoting a parameter $H_2$ as the following allocation: let $n_2 = \arg\max_{n \in R, n \le k_1+1} p_{u,n}^m$, allocate on RB $n_2$ with $t_{n2} = Q_u - k_1 T_m$ bits if the gain is positive, and allocate $t_n = T_m$ bits on RB n for n=1, . . . , $k_1+1$ except $n_2$.

5. The method of claim 4, wherein the determining a rate and gain comprises selecting the allocation with a larger gain between $H_1$ and $H_2$, then $v(u,n,m)=w_u t_n(1-p_{u,n})$, $$g(u, m) = \sum_n \max(0, v(u, n, m) - V(n)).$$

6. The method of claim 1, wherein the determining a rate and gain comprises, when a MIMO rank is at least two and there are two codewords and two MCs, for a backlogged traffic model, a weighted data rate is based in part on v(u,n,m)=$w_u r_{u,n}^m$ where $r_{u,n}^m = T_{\phi 1}(1-p_{u,n}^{\phi 1}) + T_{\phi 2}(1-p_{u,n}^{\phi 2})$, and gain is based in part on $$g(u, m) = \sum_{n=1}^{N} \max(0, v(u, n, m) - V(n)),$$

v(u,n,m) representing the weighted data rate for user u on resource block RB n with transmission mode m with queue size limit, and g(u,m) representing the total gain of user u with transmission mode m on all resource blocks RBs, each transmission mode m containing two MCSs $\phi 1$ and $\phi 2$.

7. The method of claim 1, wherein the determining a rate and gain comprises, when a MIMO rank is at least two and there are two codewords and two MCs, for a finite queue model, letting R be the set of RBs with positive gain (v(u,n,m)>V(n)) if fully allocated, letting $k_1 = \lfloor Q_u/T_m \rfloor$, $T_m = T_{\phi 1} + T_{\phi 2}$ being the transport block size with transmission m including two codewords with MCS $\phi 1$ and $\phi 2$, and if $Q_u \ge (T_{\phi 1}+T_{\phi 2})|R|$, then allocate all RBs in R to user u.

8. The method of claim 1, wherein the determining a rate and gain comprises defining $g_n(t)$ as a maximum gain with total t bits for RBs 1 to n, $s_n(t)$ being an optimal number of bits allocated to RB n in order to maximize $g_n(t)$ and applying dynamic programming to determine $g_n(t)$ and $s_n(t)$ for all n, t.

9. The method of claim 8, wherein the $g_n(t)$ and $s_n(t)$ for all n, t involves developing the recursive equations for $g_n(t)$ and $s_n(t)$, and applying these equations iteratively in the increasing order of n and t such that the results of early calculations can be reused without re-calculation.

10. The method of claim 8, wherein the determining a rate and gain comprises applying backtracking using results $s_n(t)$ to find an optimal allocation of bits to RBs to achieve a maximum gain, including drifting data from a codeword with a higher block error rate BLER to another with a lower BLER until only one codeword becomes partially allocated.

11. The method of claim 1, wherein the determining a rate and gain comprises, for a situation of one code word and two codewords, assuming a backlogged traffic model, determining the gain on each RB n the gain being g(u,n,m)=v(u,n,m)−V(n).

12. The method of claim 11, further comprising the step of only considering a set R of RBs with positive gain g(u,n,m) hereafter, if $Qu \ge (T_{\phi 1}+T_{\phi 2})|R|$, assume a backlogged traffic model and allocate all RBs in R to user u.

13. The method of claim 12, further comprising the step of sorting g(u,n,m) in a decreasing order for all RBs n in R and letting $k_1 = \lfloor Q_u/T_m \rfloor$.

14. The method of claim 13, further comprising the step of allocating $k_1$, RBs in R with the highest gain g(u,n,m) to user u.

15. The method of claim 14, further comprising the step of, for the ($k_1+1$)th RB, if allocating the remaining bits (Qu−$k_1*T_m$) to user u can achieve a positive gain, then allocate it to user u.

* * * * *